No. 881,389. PATENTED MAR. 10, 1908.
A. L. EATON.
BELT FASTENER.
APPLICATION FILED JAN. 14, 1905.
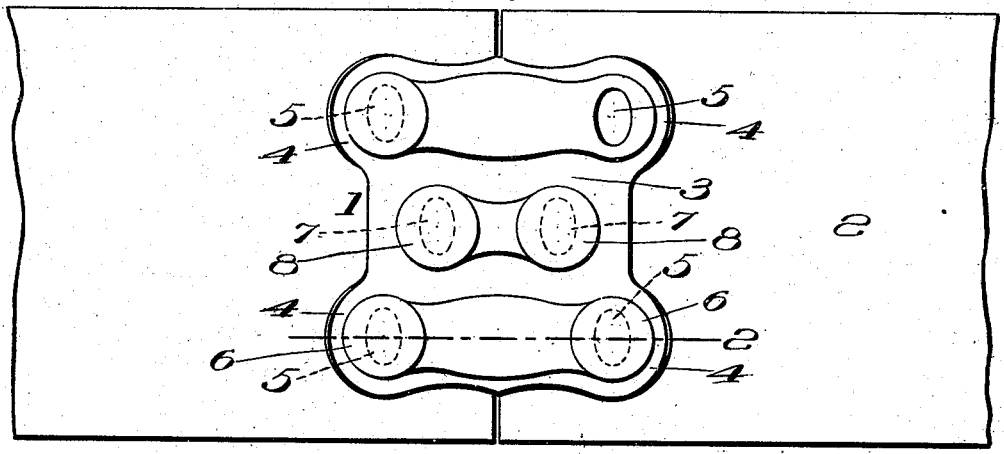
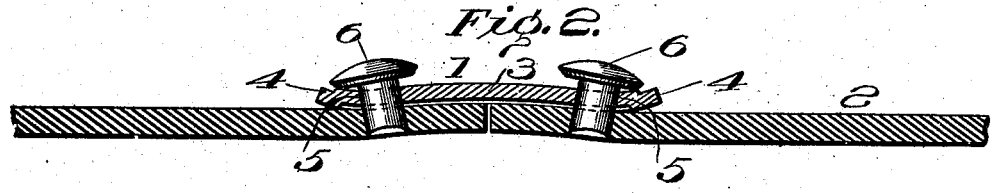
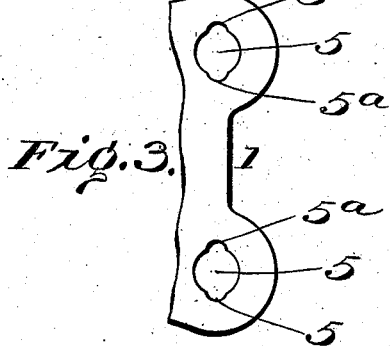
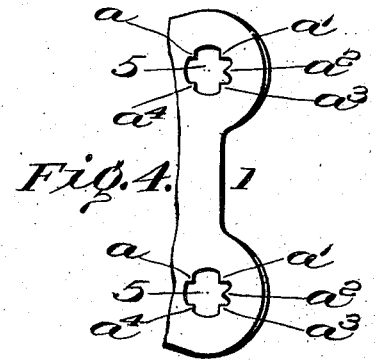

UNITED STATES PATENT OFFICE.

ANDREW L. EATON, OF NEW YORK, N. Y.

BELT-FASTENER.

No. 881,389.  Specification of Letters Patent.  Patented March 10, 1908.

Application filed January 14, 1905. Serial No. 241,032.

*To all whom it may concern:*

Be it known that I, ANDREW L. EATON, residing at New York, in the county of New York and State of New York, have invented certain new and useful Improvements in Belt-Fasteners, of which the following is a full, clear, and exact description, such as will enable others skilled in the art to which it appertains to make and use the same.

This invention relates to belt fasteners.

One of the objects thereof is to provide a simple and efficient device of the above type which will perform its functions without injury to the belt.

Another object is to provide a device of the above nature which shall be durable in construction and securely hold the parts which it is designed to connect.

Other objects will be in part obvious and in part pointed out hereinafter.

The invention accordingly consists in the features of construction, combinations of elements and arrangement of parts which will be exemplified in the device herein described, and the scope of the application of which will be indicated in the claims at the end of this description.

In the accompanying drawing which forms a part of this specification and in which the same reference character indicates the same part in the several views, Figure 1 is a plan view showing one form of my invention. Fig. 2 is a section on line 2 of Fig. 1. This figure shows the inclined openings in the plate used for the purpose of more securely holding the ends of the belt together. Fig. 3 is a view showing a slight modification in the opening in the plate for centering the rivet. Fig. 4 shows another modification.

The part marked 1 represents a plate to which are secured the meeting ends of the belt 2. This plate comprises a body portion 3 provided with outwardly curved projections 4. Perforations 5 are provided in the plate through which pass rivets 6 which are clenched on the under side of the belt to secure the belt and the plate together. Other perforations 7 may be provided in the body of the plate for the reception of rivets 8. The rivets to be used in the plate are preferably of the two-pronged or split type, and the openings 5 and 7 are elliptical in shape and so formed in the plate that the major axis extends in a direction transverse of the length of the belt. By this construction the rivets can be placed in only one direction; namely, with the legs transverse of the belt, so that the said legs can be clenched only parallel to the meeting edge of the belt.

In Fig. 3 I have shown a slight modification. In this construction the openings 5 in the plate are provided with recesses $5^a$ opposite each other so that said openings are enlarged transversely of the belt. In using a plate with such openings, the legs or prongs of the rivets are spread apart and the lower ends of the prongs are inserted in the recesses $5^a$, and when the rivets are clenched underneath the belt the prongs will lie transversely of the belt. As the distance between the edges of the openings $5^a$ is greater than the other axis of each opening, the rivets can only be inserted when positioned so that the prongs pass through the openings $5^a$.

In Fig. 4 I have shown a modification for positioning a round rivet. In this form the opening 5 is provided with a series of inward projections or lugs $a$, $a'$, $a^2$, etc. These lugs guide the rivets in place and it is to be noted that one of the lugs $a^2$, for example, is so positioned as to prevent the rivet being inserted when one of the legs strikes against this lug, but may be inserted when in position so that the legs of the rivet will lie between the lugs $a$, $a'$, $a^3$ and $a^4$.

It will be noted that in Fig. 2 the openings in the plate are inclined. This is done for the purpose of more securely holding the two ends of the belt together.

Having described my invention, what I claim as new and desire to secure by Letters Patent is:

In combination, a belt having two meeting ends, a plate with openings therein elongated transversely of the belt, and a rivet arranged in each opening and having a pair of legs, the diameter of the rivet measured across the space between said legs being equal to the minor axis of the opening in said plate and the diameter of the rivet measured parallel to said space being equal to the major axis of said opening.

In testimony whereof I affix my signature, in the presence of two witnesses.

ANDREW L. EATON.

Witnesses:
LOUIS N. WHEALTON,
S. R. RICHARDS.